(12) United States Patent
Kljun et al.

(10) Patent No.: US 11,553,355 B2
(45) Date of Patent: Jan. 10, 2023

(54) METHODS AND APPARATUS TO RECOGNIZE METERED DEVICES CONNECTED TO PROPRIETARY WIFI EXTENDERS

(71) Applicant: The Nielsen Company (US), LLC, New York, NY (US)

(72) Inventors: Anton Kljun, Bloke (SI); Joseph Kerkes, Lutz, FL (US); Marko Panger, Plavje (SI); Marko Usaj, Izola (SI)

(73) Assignee: The Nielsen Company (US), LLC, New York, NY (US)

( * ) Notice: Subject to any disclaimer, the term of this patent is extended or adjusted under 35 U.S.C. 154(b) by 29 days.

(21) Appl. No.: 17/179,330

(22) Filed: Feb. 18, 2021

(65) Prior Publication Data
US 2022/0264317 A1 Aug. 18, 2022

(51) Int. Cl.
*H04W 16/26* (2009.01)
*H04L 61/5014* (2022.01)
*H04W 8/00* (2009.01)
*H04L 101/622* (2022.01)
*H04W 72/04* (2009.01)
*H04W 84/12* (2009.01)

(52) U.S. Cl.
CPC ......... *H04W 16/26* (2013.01); *H04L 61/5014* (2022.05); *H04W 8/005* (2013.01); *H04W 72/0406* (2013.01); *H04L 2101/622* (2022.05); *H04W 84/12* (2013.01)

(58) Field of Classification Search
None
See application file for complete search history.

(56) References Cited

U.S. PATENT DOCUMENTS 10,116,535 B1 * 10/2018 Brown .................. H04L 43/062
2011/0265151 A1 * 10/2011 Furlan ................. H04L 12/2809
726/4

OTHER PUBLICATIONS

Anton Kljun, "Streaming meter generic solution for proprietary WiFi extenders", Copyright 2019 The Nielsen Company (US), LLC, Mar. 31, 2020, 7 pages.
International Searching Authority, "Written Opinion," mailed in connection with International Patent Application No. PCT/US2021/065411, dated Apr. 14, 2022, 4 pages.
International Searching Authority, "International Search Report," mailed in connection with International Patent Application No. PCT/US2021/065411, dated Apr. 14, 2022, 3 pages.

* cited by examiner

*Primary Examiner* — Hong S Cho
(74) *Attorney, Agent, or Firm* — Hanley, Flight & Zimmerman, LLC

(57) ABSTRACT

Example methods and apparatus to recognize metered devices connected to proprietary WiFi extenders are disclosed herein. In some examples, a first device comprising at least one memory including a table, and at least one processor to broadcast a first message to a network extender, the first message including a first address associated with a second device and a message identifier, identify, in response to obtaining a second message including the message identifier, a second address embedded on a data link layer of the second message, and store the second address in the table in association with the second device.

30 Claims, 6 Drawing Sheets

METHODS AND APPARATUS TO RECOGNIZE METERED DEVICES CONNECTED TO PROPRIETARY WIFI EXTENDERS

FIELD OF THE DISCLOSURE

This disclosure relates generally to WiFi extenders and, more particularly, to methods and apparatus to recognize metered devices connected to proprietary WiFi extenders.

BACKGROUND

Wireless networks are relied on by devices, such as mobile devices (e.g., smart phones, tablets such as iPads™), smart TVs, gaming consoles, set-top boxes, Internet of things devices (e.g., thermostats, Internet appliances), etc. The devices connect to wireless networks via access points such as, for example, WiFi routers and WiFi extenders. A WiFi router produces a wireless signal to provide wireless network access for the devices. However, the devices may be located outside of a range of sufficient wireless signal produced by the WiFi router. For example, the devices connected to the WiFi router may be in areas that have weak wireless signal or no wireless signal. However, the devices can have access to sufficient wireless signal by connecting to a WiFi extender. The WiFi extender expands the range of wireless network access by rebroadcasting the wireless signal produced by the WiFi router, which creates a new wireless signal.

Figure 1:
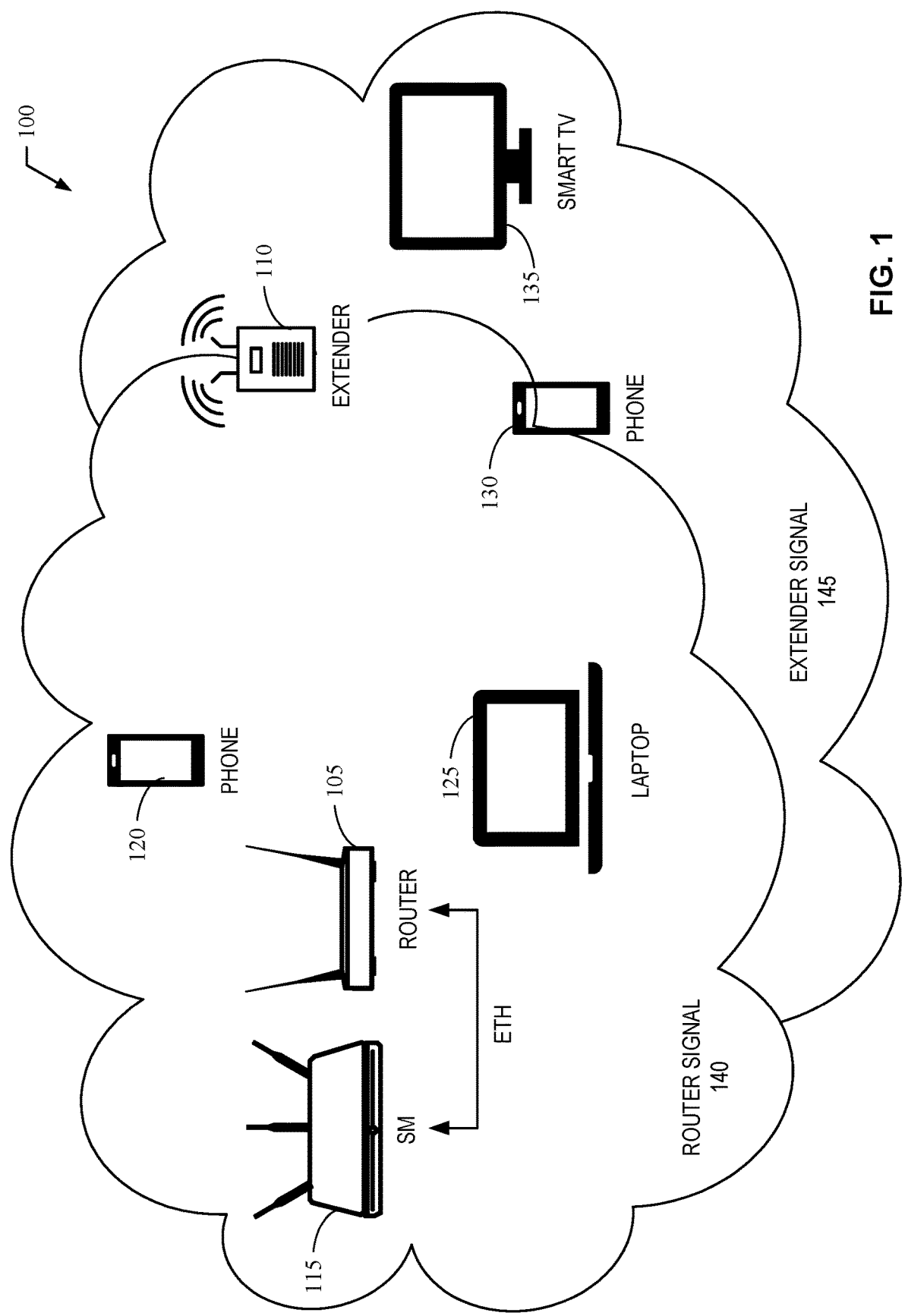
FIG. 1 illustrates an example household network topology.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Many households include a router, access point, etc. that produces a first wireless signal (e.g., a Wi-Fi signal associated with a service set identifier (SSID)). The first wireless signal provides wireless network access to couple connected devices to a network. The devices are network-enabled devices such as, for example, mobile devices (e.g., smart phones, tablets such as iPads™), smart TVs, gaming consoles, set-top boxes, Internet of things devices (e.g., thermostats, Internet appliances), etc. However, the first wireless signal may be insufficient to provide network access to all the devices in entire household or other location. In examples disclosed herein, insufficient wireless signal strength may indicate weak wireless signal strength or no wireless signal strength. Such insufficient wireless signal strength reduces ease of a device accessing the wireless network. The wireless signal strength for a device is based on factors such as, for example, a location of the device and/or a location of the router, access point, etc. For example, the device connected to the router, access point, etc. may have insufficient wireless signal strength due to physical distance between the location of the device and the location of the router, access point, etc. For example, the device connected to the router, access point, etc. may have insufficient wireless signal strength due to physical obstructions such as, for example, walls and floors between the location of the device and the location of the router.

In some examples, a network extender may be utilized to supplement the wireless signal strength of the router, access point, etc. The network extender may be located to provide sufficient wireless signal strength to a device (e.g., a device that cannot receive sufficient wireless signal strength from the router, access point, etc. Typically, the network extender is communicatively coupled to the router, access point, etc. via a wired and/or wireless connection and the network extender is communicatively coupled to network-enabled devices via a second wireless signal (e.g., a Wi-Fi connection associated with a second SSID).

A streaming meter may be used to monitor wireless network traffic activity of metered devices in the household. The metered devices may be one or more of the devices in the household. In typical streaming meters, wireless network traffic activity associated with the router, access point, etc. is monitored to track activity. In some examples, a metered device is connected to the router, access point, etc. and sends and receives data to and from the router, access point, etc. The streaming meter collects the data for monitoring. The streaming meter may identify a metered device identifier such as, for example, a media access control (MAC) address embedded on the data link layer of the obtained data. The MAC address may correspond to a stored MAC address in the streaming meter. A device name stored in the streaming meter may correspond to the stored MAC address. The device name may include a unique name to identify the metered device. For example, the streaming meter may store "Roku® device" as the unique name for the metered device.

To identify a device conducting a streaming session (e.g., streaming media), the streaming meter determines the stored MAC address that corresponds to the MAC address embedded on the data link layer of the data for the stream. The streaming meter determines the device for crediting the data based on the device name that corresponds to the stored MAC address. The streaming meter may determine additional information such as time spent on the metered device, an application opened on the metered device, internet usage of the device, etc.

Metering and device identification may be more difficult in households or other locations that include a network extender. For example, when a metered device is connected to the network extender, communications relayed by the network extender may be modified such that the MAC address identified in the communications does not match the MAC address of the actual device. In some examples disclosed herein, the network extender implements link layer routing. Link layer routing modifies a MAC address stored on a data link layer of the data during the process of communicating the data from the metered device to the router. Manufacturers of network extenders may implement different solutions for link layer routing (e.g., there is no defined rule that applies to all extenders). For example, a network extender may modify bits of the MAC address of the household device by transforms (e.g., linear transforms), randomization, bit flips, bit shifts etc. For example, a network extender may modify the MAC address of the household device by keeping the first three octets of a MAC address of the network extender, setting Universal/Local (U/L) bit to one, and keeping the last three octets of the MAC address of the household device. The U/L bit set to one indicates the MAC address assigned by the manufacturer has been modified.

In an environment that employs a network extender, a streaming meter still obtains the data received by a router, access point, etc. that is associated with the streaming meter (e.g., the streaming meter is communicatively coupled to the router, access point, etc.) and still identifies a MAC address embedded on the data link layer of the obtained data. However, in contrast to the previous examples, the MAC address stored on the data link layer does not correspond to a MAC address stored at the streaming meter (e.g., in a list of MAC addresses associated with known devices in a household or other location) because the MAC address stored on the data link layer has been modified by the network extender. As a result, the streaming meter cannot determine the device for crediting the data.

Example approaches disclosed herein implement a streaming meter that includes an extender evaluation mode (EEM) for identifying metered devices connected to network extenders. The EEM automates the identification and storage of MAC addresses or other metered device identifiers modified by the network extenders. The example EEM determines a modified MAC address for each metered device. For example, the streaming meter using the EEM may cause a network communication to be sent to the network extender using the actual MAC address of a metered device and the streaming meter records a MAC address included in an associated communication from the network extender. The streaming meter credits the data utilizing the stored modified MAC addresses by determining an actual MAC address and device associated with the modified MAC address. In some implementations, utilizing the EEM avoids the need for having a streaming meter associated with each network extender to determine the actual MAC address of devices. Instead, a streaming meter associated with a central network connection (e.g., the router, access point, etc. described above) can determine the source device of streaming from metered devices whether those metered devices are connected directly to the central network connection or a network extender. The reduction of the quantity of streaming meters in the household decreases costs, maintenance, setup time, etc. associated with the streaming meters.

FIG. 1 illustrates an example environment 100. The example environment 100 includes an example router 105, an example network extender 110, an example streaming meter 115, and an example set of devices including example devices 120, 125, 130, 135. Alternatively, the set of devices may have fewer or more than four devices.

The example router 105 is a wireless router device such as, for example, a Cisco® router, a TP-Link® router, a NETGEAR® router, etc. Alternatively, the example router 105 may be any other type of network device that wirelessly couples the devices 120, 125, 130, and 135 to a network such as, for example, an access point, a modem, etc. The example router 105 may produce an example router signal 140 that is a wireless signal with a wireless signal strength. The wireless signal strength decreases as physical distance increases from the example router 105.

The example network extender 110 is a wireless extender device that implements link layer routing such as, for example, a Cisco® extender, a TP-Link® extender, a NETGEAR® extender, etc. The example network extender 110 produces an example extender signal 145 by rebroadcasting the example router signal 140. The example extender signal 145 is a wireless signal with a wireless signal strength. The wireless signal strength decreases as the physical distance increases from the example network extender 110. While the example network extender 110 is wireless coupled to the example router 105, the example network extender 110 may alternatively be coupled to the example router 105 by a wired connection. Additionally, while the example network extender 110 re-broadcasts the wireless signal from the example router 105, the example network extender 110 may alternatively provide a unique wireless signal having different characteristics such as different network names (e.g., different SSID), different security keys or passwords, different frequencies, different protocols, etc.

The example streaming meter 115 is a streaming meter device to collect information (e.g., metering information) about streaming activity in the example environment 100. The example streaming meter 115 is a standalone device that is communicatively coupled to the example router 105 (e.g., via wired and/or wireless connection). For example, the example streaming meter 115 may be a network device such as a router that is re-programmed to perform streaming metering operations, may be a purpose-built computing device, etc. Alternatively, the example streaming meter 115 may be indirectly communicatively coupled with the example router 105 (e.g., may be connected to a network to which the example router 105 is connected). In still other examples, the example streaming meter 115 may not be connected to the network or the example router 105 but may otherwise receive data from the example router 105 (e.g., data stored and transferred to the example streaming meter 115). While the example streaming meter 115 is a standalone device, the example streaming meter 115 may alternatively be implemented within another device (e.g., implemented within the example router 105). The example streaming meter 115 automates the detection of the household network topology. The implementation and operation of the example streaming meter 115 is described in further detail in connection with FIG. 2.

Each of the example devices 120, 125, 130, 135 are internet-connected devices such as, for example, a mobile device (e.g., a smart phone, a tablet such as an iPad™), a smart TV, a laptop, a gaming console, a set-top box, an Internet of things device (e.g., a thermostat, an Internet appliance), etc. For example, the example device 120 may be a phone, the example device 125 may be a laptop, the example device 130 may be a phone, and the example device 135 may be a smart TV.

Each of the example devices 120, 125, 130, 135 may communicate with the example router 105 and/or the example network extender 110 to obtain wireless network access.

In some examples, a first set of devices from the example devices 120, 125, 130, 135 may connect to the example router 105 based on the wireless signal strength obtained by the example devices 120, 125, 130, 135. For example, assuming only physical distance is a factor affecting the wireless signal strength, the first set of devices may include the example device 120 and the example device 125. The example devices 120, 125 are connected to the example router 105 because the physical distance between the example devices 120, 125 and the example router 105 allows sufficient wireless signal strength to be obtained by the example devices 120, 125. The example router 105 may communicate between the internet and the first set of devices via the example router signal 140 to provide the first set of devices access to the internet. Alternatively, the example router 105 may communicate between the internet and the first set of devices via the example router signal 140 and/or cables such as, for example, Ethernet cables.

In some examples, a second set of devices from the example devices 120, 125, 130, 135 may connect to the example network extender 110 based on the wireless signal strength. For example, assuming only physical distance is a factor affecting the wireless signal strength, the second set of devices may include the example device 130 and the example device 135. The example devices 130, 135 are connected to the example network extender 110 because the physical distance between the example devices 130, 135 and the example network extender 110 allows sufficient wireless signal strength to be obtained by the example devices 130, 135. The example network extender 110 communicates between the example router 105 and the second set of devices via the example extender signal 145 to provide the second set of devices access to the internet. Alternatively, the example network extender 110 may communicate between the internet and the second set of devices via the example router signal 140 and/or cables such as, for example, Ethernet cables.

Figure 2:
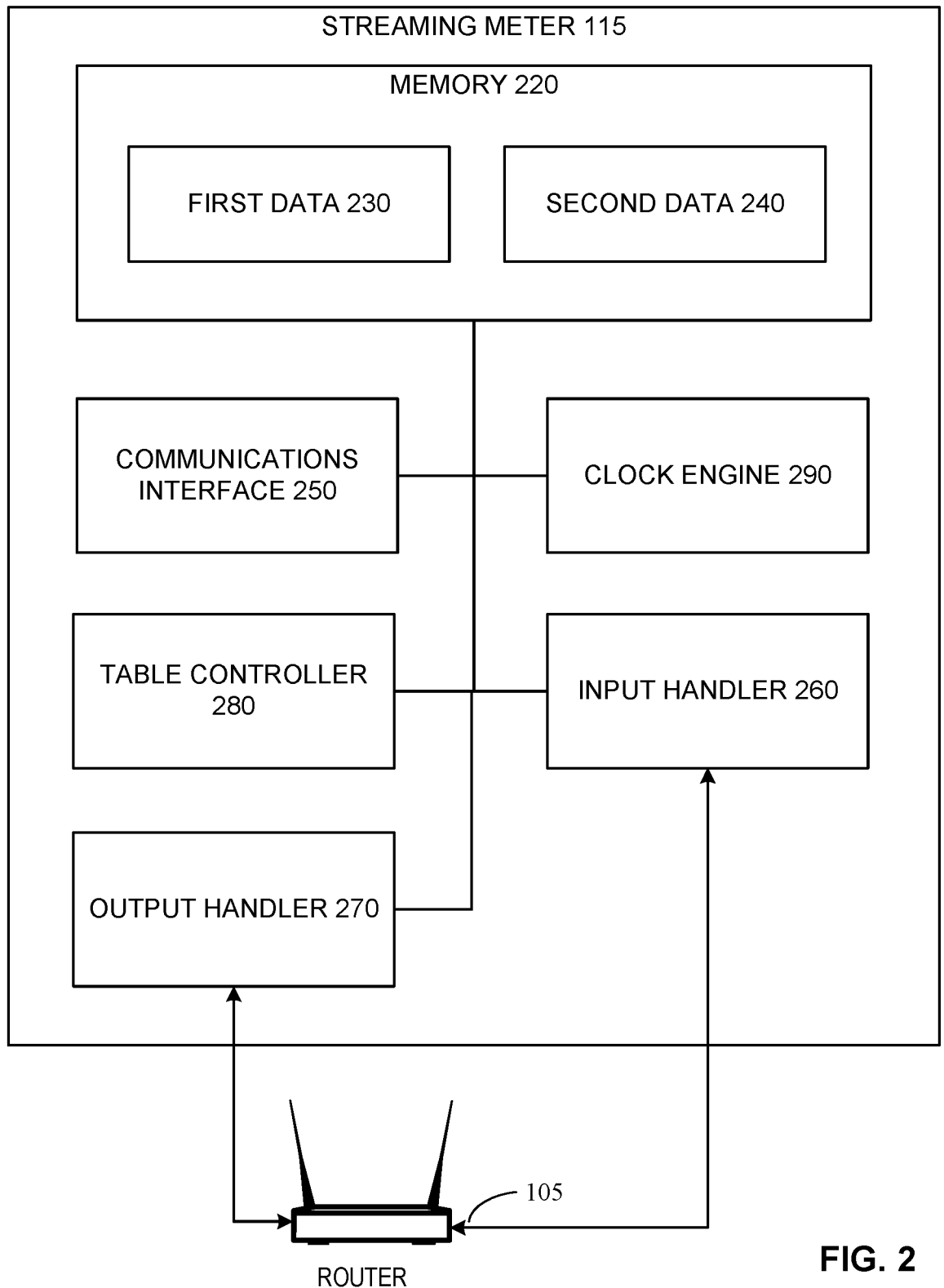
FIG. 2 is a block diagram of an example streaming meter.

FIG. 2 is a block diagram of an example streaming meter 115. The example streaming meter 115 includes an example memory 220 (an example first data 230 and an example second data 240), an example communications interface 250, an example clock engine 290, an example output handler 270, an example input handler 260, and an example table controller 280.

The example memory 220 may be implemented by at least one memory such as, for example, cache(s), random-access memory(s), hard disk drive(s), flash memory(s), read-only memory(s), compact disk(s), digital versatile disk(s), etc. The example memory 220 may include an example first data 230 and/or an example second data 240.

The example first data 230 may include a metered internet-connected devices (MICD) table including device names, device MAC addresses, and/or statuses for devices in a household. A device MAC address may be assigned by a manufacturer. Alternatively, a different device identifier may be used in place of the device MAC address. A device name may be a unique number and/or a unique name for a device such as, for example, "Roku® device." A status may be mapped, excluded, or unmapped. The metered devices include devices with mapped or excluded statuses. In some examples, the example streaming meter 115 may monitor devices, including the example devices 120 in the household based on the status. For example, the entry in the MICD table for the example device 120 may have a mapped status which indicates the example streaming meter 115 monitors all wireless network traffic activity of the example device 120, an excluded status which indicates the example streaming meter 115 monitors no wireless network traffic activity of the example device 120, or an unmapped status which indicates the example streaming meter 115 monitors only diagnostics of the example device 120. For example, a MICD table may include columns for entries, a row for device MAC addresses, a row for device names, and a row for statuses: 00.D0.56.F2.B5.12, Carrie's laptop, mapped; E8:FC:AF:B9:BE:A2., smart TV, excluded; 0A:80:0A:BB: 28:FC, phone, mapped, etc.

Additionally, the MICD table may include extender MAC addresses and/or credentials corresponding to network extenders in a household. For example, an entry for the example network extender 110 in the MICD table may include credentials. The credentials may include a password associated with the example network extender 110. Alternatively, the credentials may be the same credentials as the example router 105.

The example memory 220 stores the example second data 240. The example second data 240 may include an extender evaluation mode (EEM) transform table including entries that store the modified MAC addresses of the devices in the household when connected to the example network extender 110. Alternatively, a different modified device identifier may be used in place of the modified MAC address. The entries may also include device names and/or device MAC addresses corresponding to the modified MAC addresses. For example, entries may be for the example devices 120, 125, 130, 135 when connected to the example network extender 110. As a result, this allows identification of data from the example devices 120, 125, 130, 135 when connected to the example network extender 110. As a result, data including modified MAC addresses received by the example streaming meter 115 may be credited to corresponding metered devices based on the entries stored in the EEM transform table. For example, an EEM transform table may include columns for entries, a row for device MAC addresses, and a row for modified MAC addresses: 00.D0.56.F2.B5.12, 00:00:0A:BB:28:FC; E8:FC:AF:B9: BE:A2, 0A:80:0A:BB:28:FC, etc.

The example memory 220 may store the last known access point connection for the devices in the household to provide information on household network topology. For example, the example memory 220 may store whether the example devices 120, 125, 130, 135 are last known to be connected to the example network extender 110 or the example router 105.

The example memory 220 may store MAC address modifications performed by the network extenders and/or the devices in the household. MAC address modifications may be implemented by manufacturers of the network extenders and/or the devices for reasons such as, for example, pertaining to security. MAC address modifications may include, but not limited to, transforms (e.g., linear transforms), randomization, bit flips, bit shifts etc. For example, the example memory 220 may store a MAC address modification for the example network extender 110 and/or the example devices 120, 125, 130, 135. The example streaming meter 115 may determine the MAC address modifications based on algorithms, functions, etc.

The example communications interface 250 is implemented by a logic circuit such as, for example, a hardware processor. However, any other type of circuitry may additionally or alternatively be used such as, for example, one or more analog or digital circuit(s), logic circuit(s), programmable processor(s), ASIC(s), PLD(s), FPLD(s), programmable controller(s), GPU(s), DSP(s), CGRA(s), ISP(s), etc. The example communications interface 250 may receive an input message. For example, the input message may be sent to the example communications interface 250 from at least one input device. The at least one input device may send the input message based on data and/or commands from a user via a keyboard, a button, a mouse, a touchscreen, a trackpad, a trackball, a microphone, an audio sensor, etc. The example communications interface 250 may generate instructions based on the input message.

The example clock engine 290 may be implemented by at least one logic circuit. However, any other type of circuitry may additionally or alternatively be used such as, for example, one or more analog or digital circuit(s), hardware processor(s), programmable processor(s), ASIC(s), PLD(s), FPLD(s), programmable controller(s), GPU(s), DSP(s), CGRA(s), ISP(s), etc. The example clock engine 290 may generate instructions based on EEM diagnostic timeout and/or predetermined times.

The example output handler 270 is implemented by a logic circuit such as, for example, a hardware processor. However, any other type of circuitry may additionally or alternatively be used such as, for example, one or more analog or digital circuit(s), logic circuit(s), programmable processor(s), ASIC(s), PLD(s), FPLD(s), programmable controller(s), GPU(s), DSP(s), CGRA(s), ISP(s), etc. The example output handler 270 may impersonate devices in a household and/or broadcast messages such as, for example, dynamic host control protocol (DHCP) messages, based on instructions received by the example output handler 270. DHCP messages are standardized application layer protocols including options to implement custom payloads. Alternatively, different broadcast messages that implement the custom payload may be used. The messages may be re-broadcasted by the example network extender 110 for the example router 105.

Alternatively, the example output handler 270 may impersonate devices in a household and/or send unicast messages based on instructions received by the example output handler 270. The unicast messages may be utilized if the Wi-Fi radio of the example streaming meter 115 and the example router 105 utilize the same wireless communication band (e.g., 2.4 gigahertz). The unicast messages may include options to implement custom payloads.

The example input handler 260 may be implemented by a logic circuit such as, for example, a hardware processor. However, any other type of circuitry may additionally or alternatively be used such as, for example, one or more analog or digital circuit(s), logic circuit, programmable processor(s), ASIC(s), PLD(s), FPLD(s), programmable controller(s), GPU(s), DSP(s), CGRA(s), ISP(s), etc.

The example input handler 260 may monitor re-broadcasted messages such as, for example, DHCP discover messages, on an available port (e.g., local-area network (LAN) port, wide-area network (WAN) port) between the example input handler 260 and the example router 105. For example, the example input handler 260 may monitor an ethernet LAN interface that is connected to the example router 105 to identify DHCP discovery messages received by the example router 105. The example input handler 260 may scan the ethernet LAN interface via an ethernet cable. Alternatively, the example input handler 260 may scan utilizing any other technique that identifies the DHCP discovery messages received by the example router 105.

The example input handler 260 determines whether the scanned DHCP discovery message includes a custom payload set by the example output handler 270. The example input handler 260 identifies the modified MAC address embedded on the data link layer in response to the determination that the scanned DHCP discover message includes the custom payload. The example input handler 260 may generate instructions based on identified modified MAC address.

Alternatively, the Wi-Fi radio of the example input handler 260 may monitor the Wi-Fi radio of the example router 105 for the unicast message including the custom payload. The example input handler 260 may generate instructions based on identified modified MAC address.

The example table controller 280 is implemented by a logic circuit such as, for example, hardware processor. However, any other type of circuitry may additionally or alternatively be used such as, for example, one or more analog or digital circuit(s), logic circuit, programmable processor(s), ASIC(s), PLD(s), FPLD(s), programmable controller(s), GPU(s), DSP(s), CGRA(s), ISP(s), etc.

The example communications interface 250 may send a clock engine instruction to the example clock engine 290 based on an input message. The clock engine instruction may include an EEM diagnostic timeout. The example clock engine 290 may set an EEM diagnostic timeout based on the clock engine instruction received by the example clock engine 290 from the example communications interface 250.

The example communications interface 250 may send an MICD update table instruction to the example table controller 280 based on an input message. For example, the input message may indicate a new network extender has been added to the example environment 100. The MICD update table instruction may include a MAC address of the new network extender, an extender name, and/or credentials of the new network extender. For example, the input message may indicate a new metered device has been added to the example environment 100. The MICD update table instruction may include a device MAC address, a device name, and/or a status (e.g., mapped or excluded) of the new metered device. Alternatively, the device MAC address may be a different device identifier. For example, the input message may indicate modifications for existing entries. The modifications may include, for example, an updated status, an updated device name, updated credentials, etc.

The example table controller 280 may modify the example memory 220 based on instructions received by the example communications interface 250. For example, the example table controller 280 may update the example the MICD table in the example first data 230 based on an MICD update table instruction received by the example table controller 280 from the example communications interface

250. The updates may include creating a new entry, modifying an entry, etc. for devices and/or network extenders in the household. The example table controller 280 may send an EEM instruction to the example output handler 270 in response to completion of the updates. The EEM instruction may indicate a new device has been added to the metered devices, a new network extender has been added to the household, etc.

The example clock engine 290 may send an EEM instruction to the example output handler 270. In some examples, the EEM instruction may be sent in response to an EEM diagnostic timeout being elapsed. For example, the EEM instruction may indicate to determine and/or verify the modified MAC addresses of a set of devices from the devices in the household when connected to a set of network extenders from the network extenders in the household. The EEM diagnostic timeout may be a predetermined periodic time. For example, the predetermined periodic time may indicate to send an EEM instruction every set time such as for example, once an hour, a day, a week, etc. As a result, when the predetermined periodic time has elapsed, the example clock engine 290 sends the EEM instruction to the example communications interface 250 and the EEM diagnostic timeout resets. Alternatively, the example clock engine 290 may send the EEM instruction based on a predetermined time. The predetermined time being a calendar date and/or time. For example, the date and the time may indicate to send an EEM instruction every Tuesday at 9am EDT.

The example communications interface 250 may send an EEM instruction to the example output handler 270 based on an input message. For example, the EEM instruction may indicate to determine and/or verify the modified MAC addresses of a set of devices from the devices in the household when connected to a set of network extenders from the network extenders in the household. The set of devices may include the example devices 120, 125, 130, 135 when connected to the example network extender 110. For example, the EEM instruction may include verification information. The verification information may indicate to detect household network topology such as, for example, whether each of the example devices 120, 125, 130, 135 are connected to the example network extender 110 or the example router 105. The household network topology information may be stored in the example memory 220 and read by the example communications interface 250. The example communications interface 250 may send an output message to at least one device including the household network topology information.

The example output handler 270 obtains the EEM instruction from the example communications interface 250, the example table controller 280, and/or the example clock engine 290. Alternatively, the example output handler may detect or receive an event indicating the EEM diagnostic timeout has elapsed. In response to the obtained EEM instruction and/or event, the example output handler 270 may impersonate devices in a household based on an obtained EEM instruction from the example communications interface 250, the example clock engine 290, and/or the example table controller 280. In some examples, the EEM instruction may indicate to determine the modified MAC addresses of a set of devices in the household while connected to a set of network extenders in the household. For example, the example output handler 270 may impersonate the example device 120 by utilizing the device MAC address of the example device 120 to connect with the example network extender 110. Alternatively, a different device identifier may be used in place of the device MAC address. The example output handler 270 may request an IP address from the example network extender 110 to initiate the connection request, utilize credentials of the example network extender 110 stored in the example first data 230 to connect with the example network extender 110, and/or utilize a WiFi radio of the example output handler 270 while connecting with the example network extender 110.

The example output handler 270 may broadcast a DHCP discovery message in response to the connection between the example output handler 270 and the example network extender 110.

The DHCP discovery message includes a custom payload embedded in a vendor-specific field and is an application layer protocol. Alternatively, the example output handler 270 may utilize a message that passes through the example network extender 110 modifying the data link layer and without modifying the custom payload. Alternatively, the example output handler 270 may utilize a message that includes a field that is not modified by the example network extender 110 and/or a message that utilizes application layer protocol.

The custom payload may be implemented utilizing DHCP option 60 and/or DHCP option 61. The custom payload may include a MAC address of the example streaming meter 115. Alternatively, the custom payload may include a message identifier that indicates the example streaming meter 115 sent the DHCP discover message.

The example input handler 260 may send an update EEM transform table instruction including a modified MAC address to the example table controller 280. Such modified MAC address corresponding to a device name and/or MAC address of the device. Alternatively, the update EEM transform table instruction including a different modified device identifier. Such different modified device identifier corresponding to a device name and/or a device identifier of the device.

The example table controller 280 may modify the example memory 220 based on instructions received by the example input handler 260. For example, the example table controller 280 may update the EEM transform table in the example second data 240 based on an update EEM transform table instruction from the example input handler 260.

While an example manner of implementing the example streaming meter 115 of FIG. 1 is illustrated in FIG. 2, one or more of the elements, processes and/or devices illustrated in FIG. 2 may be combined, divided, re-arranged, omitted, eliminated and/or implemented in any other way. Further, the example memory 220 (including the example first data 230 and the example second data 240), the example communications interface 250, the example clock engine 290, the example output handler 270, the example input handler 260, the example table controller 280 and/or, more generally, the example streaming meter 115 of FIG. 1 may be implemented by hardware, software, firmware and/or any combination of hardware, software and/or firmware. Thus, for example, any of the example memory 220 (including the example first data 230 and the example second data 240), the example communications interface 250, the example clock engine 290, the example output handler 270, the example input handler 260, the example table controller 280 and/or, more generally, the example streaming meter 115 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s))

and/or field programmable logic device(s) (FPLD(s)). When reading any of the apparatus or system claims of this patent to cover a purely software and/or firmware implementation, at least one of the example, the example memory 220 (including the example first data 230 and the example second data 240), the example communications interface 250, the example clock engine 290, the example output handler 270, the example input handler 260, and/or the example table controller 280 is/are hereby expressly defined to include a non-transitory computer readable storage device or storage disk such as a memory, a digital versatile disk (DVD), a compact disk (CD), a Blu-ray disk, etc. including the software and/or firmware. Further still, the example streaming meter 115 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
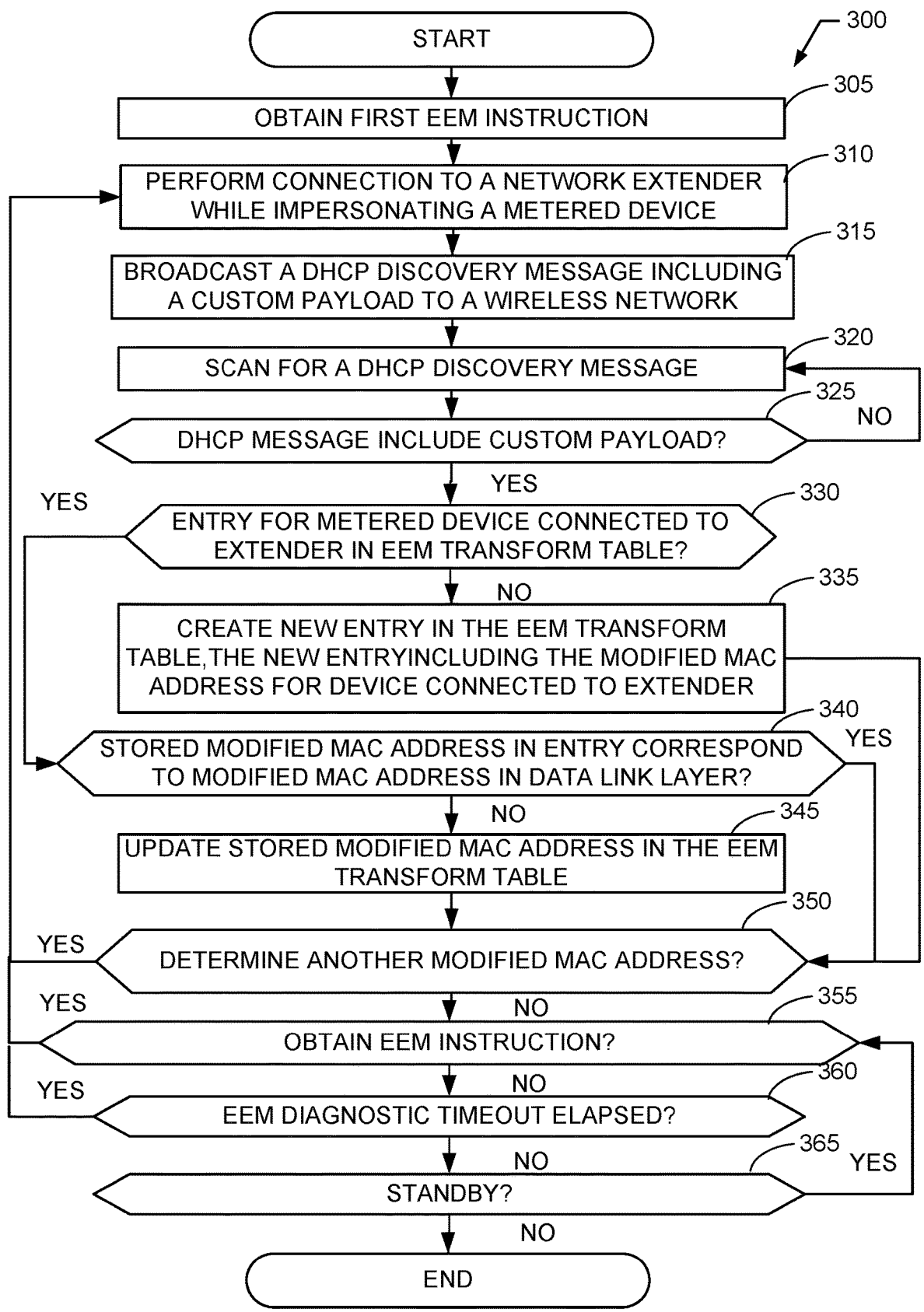
FIG. 3 is a flowchart representative of machine-readable instructions which may be executed to implement the example streaming meter to verify and/or determine the modified media access control (MAC) addresses stored in an extender evaluation mode (EEM) transform table in example data for the metered devices.
Figure 4:
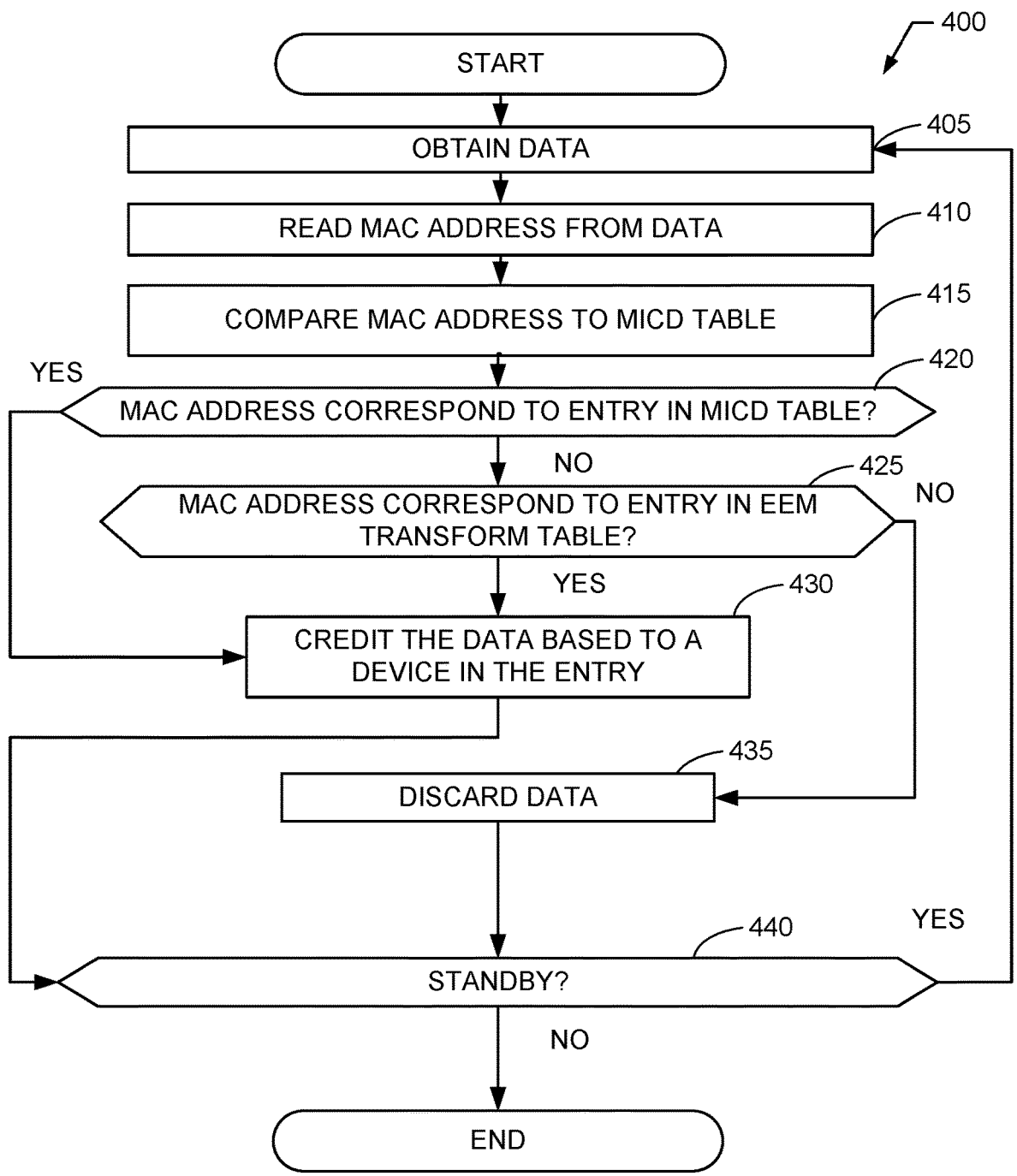
FIG. 4 is a flowchart representative of machine-readable instructions which may be executed to implement the example streaming meter to determine a metered device for crediting data.

A flowchart representative of example hardware logic, machine readable instructions, hardware implemented state machines, and/or any combination thereof for implementing the example streaming meter 115 of FIG. 1 is shown in FIGS. 3 and 4. The machine readable instructions may be one or more executable programs or portion(s) of an executable program for execution by a computer processor and/or processor circuitry, such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIGS. 3 and 4, many other methods of implementing the example streaming meter 115 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3 and 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of machine-readable instructions which may be executed to implement the example streaming meter 115 to verify and/or determine the modified MAC addresses stored in the EEM transform table in example second data 240 for the metered devices. Alternatively, different modified device identifiers may be determined in place of the modified MAC addresses. The example program 300 of FIG. 3 begins when the example output handler 270 obtains a first EEM instruction. (Block 305). The first EEM instruction may be obtained in response to a ready MICD table including metered devices, network extenders, and/or credentials corresponding to the network extenders. The first EEM instruction may indicate to broadcast a set of DHCP discovery messages to the set of network extenders while impersonating the set of metered devices. The first EEM instruction may indicate an EEM transform table is empty, therefore the set of metered devices may include all metered devices in a household and the set of network extenders may include all network extenders in the household.

At block 310, the example output handler 270 performs a connection to a network extender in the household while impersonating a metered device connected to the network extender. (Block 310). The example output handler 270 may utilize a MAC address associated with the metered device of the set of metered devices, the MAC address stored in the MICD table in the example first data 230. For example, the example output handler 270 may impersonate the example device 120 connected to the example network extender 110 by utilizing the MAC address associated with the example device 120 stored in the MICD table in the example first data 230, the example device 120 of the set of metered devices and the example network extender 110 of the set of network extenders. The example output handler 270 may request an IP address from the example network extender 110 to initiate the connection request. The example output handler 270 may utilize credentials of the example network extender 110 stored in the example first data 230 to connect with the example network extender 110. The example output handler 270 may utilize a WiFi radio of the example output handler 270 while connecting with the example network extender 110.

At block 315, the example output handler 270 broadcasts a DHCP discovery message including a custom payload to a wireless network in the household. (Block 315). For example, the custom payload may include a message identifier such as, for example, a MAC address associated with example streaming meter 115.

At block 320, the example input handler 260 scans for a DHCP discovery message received by a router in the household. (Block 320). For example, the example input handler 260 may scan the DHCP discovery message on the ethernet LAN interface connected to the example router 105.

At block 325, the example input handler 260 determines whether the scanned DHCP discovery message includes the custom payload. (Block 325).

If the example input handler 260 determines the DHCP discovery message does not include the custom payload (e.g., Block 325 returns a result of NO), the example input handler 260 returns to block 320.

At block 330, if the example input handler 260 determines that the DHCP discovery message does include the custom payload (e.g., Block 325 returns a result of YES), the example table controller 280 determines whether an entry in the EEM transform table in the example second data 240 corresponds to the metered device connected to the network extender. (Block 330). For example, the example table controller 280 may determine whether an entry in the EEM transform table in the example second data 240 includes the MAC address associated with the example device 120 connected to the example network extender 110.

At block 335, if the example table controller 280 determines there is no entry in the EEM transform table in the example second data 240 for the device connected to the network extender (e.g., Block 330 returns a result of NO), the example table controller 280 creates a new entry in the EEM transform table in the example second data 240 including a modified MAC address embedded on the data link layer. For example, the new entry may include the modified MAC address embedded on the data link layer, the device MAC address associated with the example device 120, and the MAC address associated with the example network extender 110. The example table controller 280 continues to block 350.

At block 340, if the example table controller 280 determines there is an entry in the EEM transform table in the example second data 240 for the device connected to the network extender (e.g., Block 330 returns a result of YES), the example table controller 280 determines whether the stored modified MAC address in the entry corresponds to a MAC address embedded on a data link layer of the DHCP discovery message including the custom payload. (Block 340).

At block 345, if the example table controller 280 determines the stored modified MAC address in the EEM transform table in the example second data 240 does not correspond to the MAC address embedded on the data link layer (e.g., Block 340 returns a result of NO), the example table controller 280 updates the stored modified MAC address in the EEM transform table to the MAC address embedded on the data link layer of the DHCP discovery message including the custom payload. (Block 345).

If the example table controller 280 determines the stored modified MAC address in the EEM transform table in the example second data 240 corresponds to the MAC address embedded on the data link layer (e.g., Block 340 returns a result of YES), the example table controller 280 continues to block 350.

At block 350, the example output handler 270 determines whether another modified MAC address is to be determined. (Block 355). For example, whether a modified MAC address for each metered device of the set of metered devices connected to each network extender from the set of network extenders has been determined.

If the example output handler 270 determines another modified MAC address is to be determined (e.g., Block 350 returns a result of YES), the example output handler 270 returns to block 310 to perform a connection between a new metered device of the set of metered devices and/or a new network extender of the set of network extenders. For example, the connection may be between the example device 120 and a network extender in the household different than the example network extender 110. For example, the connection may be between the example device 120 connected to the example network extender 110.

At block 355, if the example output handler 270 determines a modified MAC address for each metered device of the set of metered devices connected to each network extender from the set of network extenders has not been determined (e.g., Block 350 returns a result of NO), the example output handler 270 determines whether an EEM instruction has been obtained. In some examples, the EEM instruction may indicate there has been an update to the MICD table. For example, an update indicating a new device has been added to the set of metered devices and/or a new network extender has been added to the set of network extenders in the household. In some examples, the EEM instruction may indicate the EEM transform table is to be verified.

If the example output handler 270 determines an EEM instruction has been obtained (e.g., Block 355 returns a result of YES), the example output handler 270 returns to block 310. For example, the EEM instruction may indicate a new network extender, therefore the set of metered devices may include all of the metered devices in the household and the set of network extenders may include just the new network extender. The EEM instruction may indicate a new device, therefore the set of metered devices may include just the new device and the set of metered devices may include just the new metered device. For example, the EEM instruction may indicate the EEM transform table is to be verified, therefore the set of metered devices may include all of the metered devices in the household and the set of network extenders may include all of the network extenders.

At block 360, if the example output handler 270 determines an EEM instruction has not been obtained (e.g., Block 355 returns a result of NO), the example output handler 270 determines whether an EEM diagnostic timeout has elapsed. The example clock engine 290 may send an EEM instruction indicating a set of metered devices and a set of network extenders. Alternatively, the example output handler 270 may obtain an event indicating the EEM diagnostic timeout has elapsed, therefore a set of metered devices may include all of the metered devices in the household and a set of network extenders may include all of the network extenders in the household.

If the example output handler 270 determines the example output handler 270 determines an EEM diagnostic timeout has elapsed (e.g., Block 360 returns a result of YES), the example output handler 270 returns to block 310.

At block 365, if the example output handler 270 determines the example output handler 270 determines an EEM diagnostic timeout has not elapsed (e.g., Block 360 returns a result of NO), the example output handler 270 determines whether to standby for another instruction and/or event.

If the example output handler 270 determines to standby for another instruction and/or event (e.g., Block 365 returns a result of YES), the example output handler 270 may return to block 355.

If the example output handler 270 determines to standby for another instruction and/or event (e.g., Block 365 returns a result of NO), the example program 300 of FIG. 3 may terminate.

FIG. 4 is a flowchart representative of machine-readable instructions which may be executed to implement the example streaming meter 115 to determine a metered device for crediting data. Alternatively, the machine-readable instructions may be executed on a device other than the example streaming meter 115 to determine a metered device for crediting data.

At block 405, the example streaming meter 115 may obtain the data.

At block 410, the example streaming meter 115 may read a MAC address embedded in the data.

At block 415, the example streaming meter 115 may compare the MAC address to stored MAC addresses in the MICD table in the example first data 230.

At block 420, the example streaming meter 115 determines whether the MAC address corresponds to a stored MAC address in an entry of the MICD table in the example first data 230.

At block 425, if the example streaming meter 115 determines the MAC address does not correspond to a stored MAC address in an entry of the MICD table in the example first data 230 (e.g., Block 420 returns a result of NO), the example streaming meter 115 determines whether the MAC address corresponds to a stored MAC address in an entry of the EEM transform table in the example second data 240.

At block 430, if the example streaming meter 115 determines the MAC address corresponds to a stored MAC address in the MICD table in the example first data 230 and/or the EEM transform table in the example second data 240 (e.g., Block 420 and/or Block 425 returns a result of YES), the example streaming meter 115 credits the data to a device corresponding to the entry. For example, the device may be identified by a device name in the entry.

At block 435, if the example streaming meter 115 determines the MAC address does not correspond to a stored MAC address in an entry of the EEM transform table in the example second data 240, the example streaming meter 115 discards the data.

At block 440, the example streaming meter 115 determines whether to standby for data to be obtained.

If the example streaming meter 115 determines to standby for data to be obtained (e.g., Block 440 returns a result of YES), example streaming meter 115 may return to block 405.

If the example streaming meter 115 determines to not standby for data to be obtained (e.g., Block 440 returns a result of NO), the example program 400 of FIG. 4 may terminate.

Figure 5:
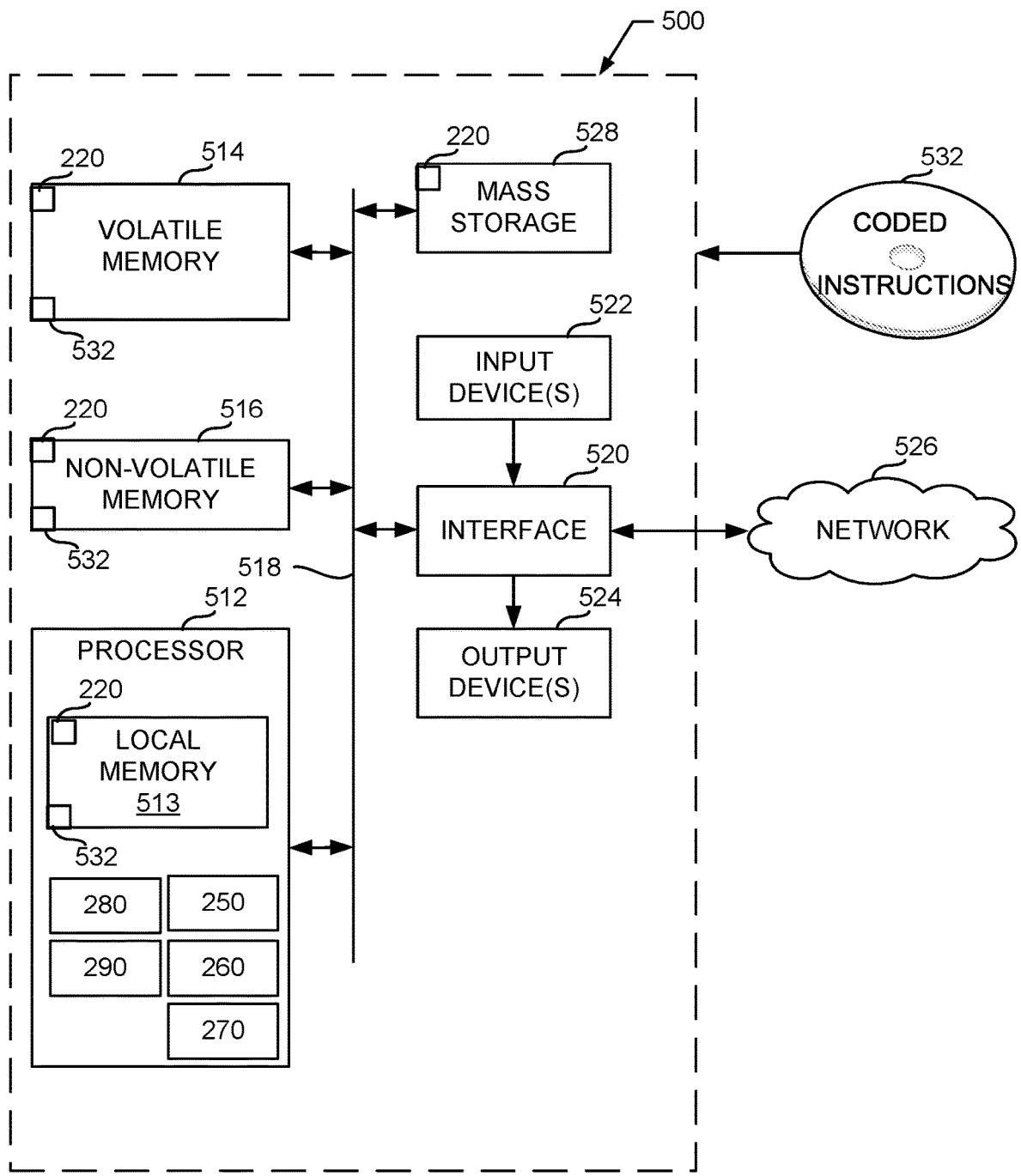
FIG. 5 is a block diagram of an example processing platform structured to execute the instructions of FIGS. 3 and 4 to implement the example streaming meter of FIG. 2.

FIG. 5 is a block diagram of an example processor platform 500 structured to execute the instructions of FIGS. 3 and 4 to implement the apparatus of FIG. 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example communications interface 250, the example clock engine 290, the example output handler 270, the example input handler 260, and the example table controller 280.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIG. 2 may be stored in the mass storage device 528, in the volatile memory 514, in the non-volatile memory 516, and/or on a removable non-transitory computer readable storage medium such as a CD or DVD.

Figure 6:
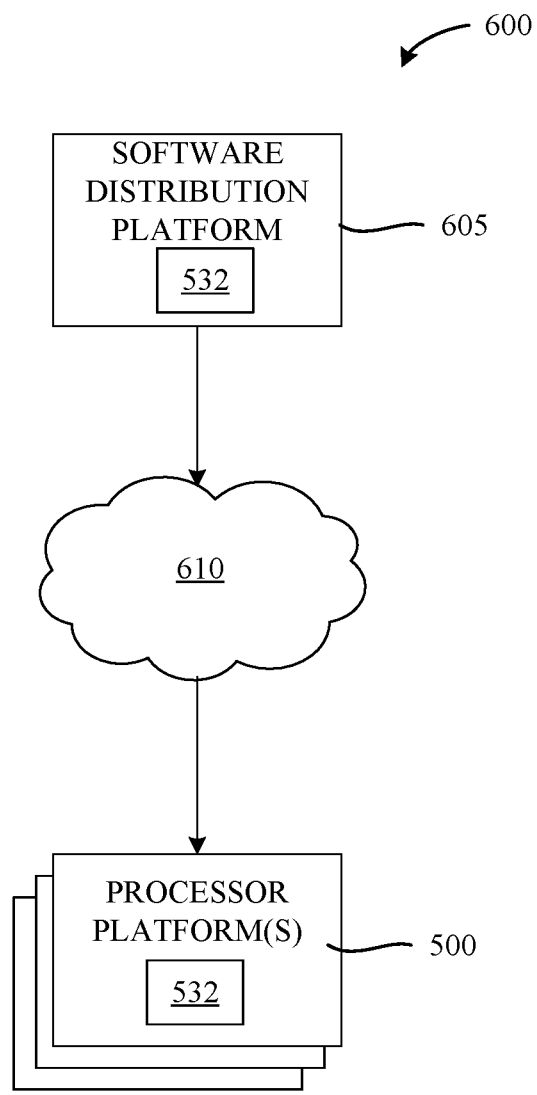
FIG. 6 is a block diagram of an example software distribution platform to distribute software (e.g., software corresponding to the example computer readable instructions of FIGS. 3 and 4) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 605 to distribute software such as the example computer readable instructions 532 of FIGS. 3 and 4 to third parties is illustrated in FIG. 6. The example software distribution platform 605 may be implemented by any computer server, data facility, cloud service, etc., capable of storing and transmitting software to other computing devices. The third parties may be customers of the entity owning and/or operating the example software distribution platform 605. For example, the entity that owns and/or operates the example software distribution platform 605 may be a developer, a seller, and/or a licensor of software such as the example computer readable instructions 632 of FIGS. 3 and 4. The third parties may be consumers, users, retailers, OEMs, etc., who purchase and/or license the software for use and/or re-sale and/or sub-licensing. In the illustrated example, the example software distribution platform 605 includes one or more servers and one or more storage devices. The storage devices store the computer readable instructions 632, which may correspond to the example computer readable instructions 632 of FIGS. 9 and 10, as described above. The one or more servers of the example software distribution platform 605 are in communication with a network 610, which may correspond to any one or more of the Internet and/or any of the example networks 526 described above. In some examples, the one or more servers are responsive to requests to transmit the software to a requesting party as part of a commercial transaction. Payment for the delivery, sale and/or license of the software may be handled by the one or more servers of the example software distribution platform 605 and/or via a third party payment entity. The servers enable purchasers and/or licensors to download the computer readable instructions 532 from the example software distribution platform 605. For example, the software, which may correspond to the example computer readable instructions 532 of FIGS. 3 and 4, may be downloaded to the example processor platform 600, which is to execute the computer readable instructions 632 to implement the apparatus of FIG. 2. In some examples, one or more servers of the example software distribution platform 605 periodically offer, transmit, and/or force updates to the software (e.g., the example computer readable instructions 532 of FIGS. 3 and 4) to ensure improvements, patches, updates, etc. are distributed and applied to the software at the end user devices.

From the foregoing, it will be appreciated that example methods, apparatus and articles of manufacture improve a streaming meter by adding a capability to execute an extender evaluation mode (EEM) for identifying metered devices connected to network extenders (e.g., wireless network extenders). Such network extenders may implement link layer routing that modifies identification information (e.g., a MAC address) included in communications that route through the network extenders. The EEM automates the identification and storage of MAC addresses or other device identifiers modified by the network extenders for each metered device. The streaming meter credits the data utilizing the stored modified MAC addresses, which avoids the need to connect an additional streaming meter to each of the network extenders. The reduction of the quantity of streaming meters in the household decreases costs, maintenance, etc. associated with the streaming meters. The disclosed methods, apparatus and articles of manufacture improve the efficiency of using a computing device by automating the collection, identification, and storage of MAC addresses modified by the network extenders for each metered device to credit data from metered devices. The disclosed methods, apparatus and articles of manufacture are accordingly directed to one or more improvement(s) in the functioning of a computer.

Example methods and apparatus to recognize metered devices connected to proprietary WiFi extenders are disclosed herein. Further examples and combinations thereof include the following:

Example 1 includes a first device comprising at least one memory including a table, and at least one processor to broadcast a first message to a network extender, the first message including a first address associated with a second device and a message identifier, identify, in response to obtaining a second message including the message identifier, a second address embedded on a data link layer of the second message, and store the second address in the table in association with the second device.

Example 2 includes the first device of example 1, wherein the first address is a first media access control (MAC) address and the second address is a second MAC address and the network extender modifies the first MAC address to create the second MAC address.

Example 3 includes the first device of example 1, wherein the first message is to be received by the network extender, the first message including the first address, the first address indicating to the network extender the first message is from the second device.

Example 4 includes the first device of example 1, wherein the first message and the second message are dynamic host control protocol discovery messages.

Example 5 includes the first device of example 1, wherein the second device is associated with a status, the status indicating whether data from the second device is credited.

Example 6 includes the first device of example 1, the at least one memory further including a timeout, the timeout being a predetermined time, and a second table, the second table including a set of extender MAC addresses corresponding to a set of network extenders, credentials associated with a first extender MAC address of the set of extender MAC addresses, the first extender MAC address associated with a first network extender of the set of network extenders, a set of MAC addresses associated with a set of devices, and a set of statuses associated with the set of MAC addresses.

Example 7 includes the first device of example 6, wherein the at least one processor is to perform at least one connection to a subset of network extenders of the set of network extenders utilizing a subset of MAC addresses of the set of MAC addresses, in response to an event indicating at least one of an input message, the timeout being elapsed, or an update of the second table.

Example 8 includes the first device of example 6, wherein the at least one processor is to connect to the first network extender based on the first extender MAC address and the credentials.

Example 9 includes the first device of example 1, wherein the at least one processor is to obtain the second message from a router, and data including a third address corresponding to at least one of the second address or the first address, the data credited to the second device.

Example 10 includes an apparatus comprising at least one memory including a table, an output handler to broadcast a first message to a network extender, the first message including a first address associated with a second device and a message identifier, an input handler to identify, in response to obtaining a second message including the message identifier, a second address embedded on a data link layer of the second message, and a table controller to store the second address in the table in association with the second device.

Example 11 includes the apparatus of example 10, wherein the first address is a first media access control (MAC) address and the second address is a second MAC address and the network extender modifies the first MAC address to create the second MAC address.

Example 12 includes the apparatus of example 10, wherein the first message is to be received by the network extender, the first message including the first address, the first address indicating to the network extender the first message is from the second device.

Example 13 includes the apparatus of example 10, wherein the first message and the second message are dynamic host control protocol discovery messages.

Example 14 includes the apparatus of example 10, wherein the second device is associated with a status, the status indicating whether data from the second device is credited.

Example 15 includes the apparatus of example 10, the at least one memory further including a timeout, the timeout being a predetermined time, and a second table, the second table including a set of extender MAC addresses corresponding to a set of network extenders, credentials associated with a first extender MAC address of the set of extender MAC addresses, the first extender MAC address associated with a first network extender of the set of network extenders, a set of first MAC addresses associated with a set of devices, the set of first MAC addresses including the first MAC address, and a set of statuses associated with the set of first MAC addresses.

Example 16 includes the apparatus of example 15, wherein the output handler is to perform at least one connection to a subset of network extenders of the set of network extenders utilizing a subset of first MAC addresses of the set of first MAC addresses, in response to receiving instructions from at least one of a communications interface, a clock engine, or the table controller.

Example 17 includes the apparatus of example 16, wherein the communications interface is to send the instructions in response to an input message, the clock engine is to send the instructions in response to the timeout being elapsed, and the table controller is to send the instructions in response to completing updates on the second table.

Example 18 includes the apparatus of example 16, wherein the table controller is to store a set of second MAC addresses identified by the input handler to the table, the set of second MAC addresses associated with the subset of first MAC addresses connected to the subset of network extenders.

Example 19 includes the apparatus of example 16, wherein the output handler is to connect to the first network extender based on the first extender MAC address and the credentials.

Example 20 includes the apparatus of example 10, wherein the input handler is to obtain the second message from a router, and data including a third address corresponding to at least one of the second address or the first address, the data credited to the second device.

Example 21 includes a method comprising broadcasting a first message to a network extender, the first message including a first address associated with a second device and a message identifier, identifying, in response to obtaining a second message including the message identifier, a second address embedded on a data link layer of the second message, and storing the second address in a table in association with the second device. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A first device comprising:
   at least one memory including a table; and
   at least one processor to:
      broadcast a first message to a network extender, the first message including a first address associated with a second device and a message identifier;
      identify, in response to obtaining a second message including the message identifier, a second address embedded on a data link layer of the second message; and
      store the second address in the table in association with the second device.

2. The first device of claim 1, wherein the first address is a first media access control (MAC) address and the second address is a second MAC address and the network extender modifies the first MAC address to create the second MAC address.

3. The first device of claim 1, wherein the first message is to be received by the network extender, the first message including the first address, the first address indicating to the network extender the first message is from the second device.

4. The first device of claim 1, wherein the first message and the second message are dynamic host control protocol discovery messages.

5. The first device of claim 1, wherein the second device is associated with a status, the status indicating whether data from the second device is credited.

6. The first device of claim 1, the at least one memory further including:
   a timeout, the timeout being a predetermined time; and
   a second table, the second table including:
      a set of extender MAC addresses corresponding to a set of network extenders;
      credentials associated with a first extender MAC address of the set of extender MAC addresses, the first extender MAC address associated with a first network extender of the set of network extenders;
      a set of MAC addresses associated with a set of devices; and
      a set of statuses associated with the set of MAC addresses.

7. The first device of claim 6, wherein the at least one processor is to perform at least one connection to a subset of network extenders of the set of network extenders utilizing a subset of MAC addresses of the set of MAC addresses, in response to an event indicating at least one of an input message, the timeout being elapsed, or an update of the second table.

8. The first device of claim 6, wherein the at least one processor is to connect to the first network extender based on the first extender MAC address and the credentials.

9. The first device of claim 1, wherein the at least one processor is to obtain:
   the second message from a router; and
   data including a third address corresponding to at least one of the second address or the first address, the data credited to the second device.

10. An apparatus comprising:
    at least one memory including a table;
    an output handler to broadcast a first message to a network extender, the first message including a first address associated with a second device and a message identifier;
    an input handler to identify, in response to obtaining a second message including the message identifier, a second address embedded on a data link layer of the second message; and
    a table controller to store the second address in the table in association with the second device.

11. The apparatus of claim 10, wherein the first address is a first media access control (MAC) address and the second address is a second MAC address and the network extender modifies the first MAC address to create the second MAC address.

12. The apparatus of claim 10, wherein the first message is to be received by the network extender, the first message including the first address, the first address indicating to the network extender the first message is from the second device.

13. The apparatus of claim 10, wherein the first message and the second message are dynamic host control protocol discovery messages.

14. The apparatus of claim 10, wherein the second device is associated with a status, the status indicating whether data from the second device is credited.

15. The apparatus of claim 10, the at least one memory further including:
    a timeout, the timeout being a predetermined time; and
    a second table, the second table including:
       a set of extender MAC addresses corresponding to a set of network extenders;
       credentials associated with a first extender MAC address of the set of extender MAC addresses, the first extender MAC address associated with a first network extender of the set of network extenders;
       a set of first MAC addresses associated with a set of devices, the set of first MAC addresses including the first MAC address; and
       a set of statuses associated with the set of first MAC addresses.

16. The apparatus of claim 15, wherein the output handler is to perform at least one connection to a subset of network extenders of the set of network extenders utilizing a subset of first MAC addresses of the set of first MAC addresses, in response to receiving instructions from at least one of a communications interface, a clock engine, or the table controller.

17. The apparatus of claim 16, wherein the communications interface is to send the instructions in response to an input message, the clock engine is to send the instructions in response to the timeout being elapsed, and the table controller is to send the instructions in response to completing updates on the second table.

18. The apparatus of claim 16, wherein the table controller is to store a set of second MAC addresses identified by the input handler to the table, the set of second MAC addresses associated with the subset of first MAC addresses connected to the subset of network extenders.

19. The apparatus of claim 16, wherein the output handler is to connect to the first network extender based on the first extender MAC address and the credentials.

20. The apparatus of claim 10, wherein the input handler is to obtain:
the second message from a router; and
data including a third address corresponding to at least one of the second address or the first address, the data credited to the second device.

21. A method comprising:
broadcasting a first message to a network extender, the first message including a first address associated with a second device and a message identifier;
identifying, in response to obtaining a second message including the message identifier, a second address embedded on a data link layer of the second message; and
storing the second address in a table in association with the second device.

22. The method of claim 21, wherein the first address is a first media access control (MAC) address and the second address is a second MAC address and the network extender modifies the first MAC address to create the second MAC address.

23. The method of claim 21, wherein the first message is to be received by the network extender, the first message including the first address, the first address indicating to the network extender the first message is from the second device.

24. The method of claim 21, wherein the first message and the second message are dynamic host control protocol discovery messages.

25. The method of claim 21, wherein the second device is associated with a status, the status indicating whether data from the second device is credited.

26. The method of claim 21, further including:
determining whether a timeout has elapsed, the timeout being a predetermined time; and
storing data in a second table, the second table including:
a set of extender MAC addresses corresponding to a set of network extenders;
credentials associated with a first extender MAC address of the set of extender MAC addresses, the first extender MAC address associated with a first network extender of the set of network extenders;
a set of first MAC addresses associated with a set of devices, the set of first MAC addresses including the first MAC address; and
a set of statuses associated with the set of first MAC addresses.

27. The method of claim 26, further including performing at least one connection to a subset of network extenders of the set of network extenders utilizing a subset of first MAC addresses of the set of first MAC addresses, in response to at least one of receiving an input message, determining the timeout has elapsed, or updating the second table.

28. The method of claim 27, further including storing a set of second MAC addresses to the table, the set of second MAC addresses associated with the subset of first MAC addresses connected to the subset of network extenders.

29. The method of claim 27, further including connecting to the first network extender based on the first extender MAC address and the credentials.

30. The method of claim 21, further including obtaining:
the second message from a router; and
data including a third address corresponding to at least one of the second address or the first address, the data credited to the second device.

* * * * *